US010655748B2

(12) United States Patent
Ho

(10) Patent No.: US 10,655,748 B2
(45) Date of Patent: May 19, 2020

(54) MAGNETIC LATCHING SOLENOID VALVE

(71) Applicant: Bendix Commercial Vehicle Systems LLC, Elyria, OH (US)

(72) Inventor: Thanh Ho, Brunswick, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 35 days.

(21) Appl. No.: 16/034,819

(22) Filed: Jul. 13, 2018

(65) Prior Publication Data

US 2020/0018417 A1    Jan. 16, 2020

(51) Int. Cl.
| F16K 27/04 | (2006.01) |
| F16K 31/08 | (2006.01) |
| F16K 31/06 | (2006.01) |
| H01F 7/16  | (2006.01) |
| H01F 7/18  | (2006.01) |
| F16K 13/00 | (2006.01) |
| H01F 7/122 | (2006.01) |

(52) U.S. Cl.
CPC .......... F16K 31/082 (2013.01); F16K 27/048 (2013.01); F16K 31/0651 (2013.01); H01F 7/1615 (2013.01); H01F 7/1805 (2013.01); F16K 13/00 (2013.01); H01F 7/122 (2013.01)

(58) Field of Classification Search
None
See application file for complete search history.

(56) References Cited

U.S. PATENT DOCUMENTS 3,043,336 A     7/1962  Parent et al.
3,842,860 A *  10/1974  Stampfli ............. F16K 31/0606
                                                137/596.17
(Continued)

FOREIGN PATENT DOCUMENTS

DE    2 321 021 A1    11/1974
DE    37 30 381 A1    3/1989
(Continued)

OTHER PUBLICATIONS

International Search Report issued in corresponding International (PCT) Patent Application No. PCT/US2019/041506 (dated Oct. 2, 2019).
(Continued)

Primary Examiner — John Fox
(74) Attorney, Agent, or Firm — Reising Ethington P.C.

(57) ABSTRACT

A latching valve has a valve body defining a fluid chamber and supply, delivery, and exhaust ports. A solenoid within the chamber includes a pole piece defining a fluid passage between the chamber and exhaust port and having one end facing the exhaust port and another end defining a first valve seat. A coil is disposed about the pole piece. A housing has a portion radially outward of the coil and portions extending radially inwardly on opposite sides of the coil radially aligned with the pole piece and an armature. The armature has one end configured for engagement with the first valve seat and another end configured for engagement with a second valve seat formed in the valve body between the fluid chamber and supply port. A return spring biases the armature towards the second valve seat. A magnet ring is disposed about the armature in contact with the housing.

26 Claims, 1 Drawing Sheet

(56) References Cited

U.S. PATENT DOCUMENTS

| | | | | |
|---|---|---|---|---|
| 3,921,666 | A | * | 11/1975 | Leiber ................. B60T 8/17613 |
| | | | | 137/557 |
| 4,299,252 | A | | 11/1981 | Reinicke |
| 4,419,643 | A | | 12/1983 | Ojima et al. |
| 4,524,797 | A | | 6/1985 | Lungu |
| 4,534,539 | A | * | 8/1985 | Dettmann ............. F16K 31/082 |
| | | | | 251/65 |
| 4,538,129 | A | * | 8/1985 | Fisher ................... F16K 31/082 |
| | | | | 137/625.65 |
| 4,624,285 | A | | 11/1986 | Perach |
| 5,251,667 | A | * | 10/1993 | Kunz .................... F16K 11/044 |
| | | | | 137/607 |
| 5,992,461 | A | * | 11/1999 | Gilmore .................. H01F 7/081 |
| | | | | 137/625.65 |
| 6,164,322 | A | * | 12/2000 | Najmolhoda ......... F15B 13/024 |
| | | | | 137/539 |
| 6,199,587 | B1 | | 3/2001 | Shlomi et al. |
| 6,722,626 | B2 | * | 4/2004 | Balsdon ............. F02M 25/0836 |
| | | | | 123/520 |
| 7,280,019 | B2 | | 10/2007 | Kolb et al. |
| 7,562,675 | B2 | * | 7/2009 | Nomichi .................. F16K 1/443 |
| | | | | 137/624.21 |
| 7,605,680 | B2 | | 10/2009 | Matsumoto et al. |
| 8,141,842 | B2 | | 3/2012 | Imamura et al. |
| 8,274,348 | B2 | | 9/2012 | Kolb et al. |
| 8,322,376 | B2 | * | 12/2012 | Ho ...................... F16K 31/0606 |
| | | | | 137/625.65 |
| 8,474,487 | B2 | | 7/2013 | Ho |
| 8,590,571 | B2 | | 11/2013 | Ho |
| 8,950,381 | B2 | | 2/2015 | Larsson et al. |
| 9,428,164 | B2 | | 8/2016 | Ho et al. |
| 9,458,946 | B2 | | 10/2016 | Kocourek |
| 2006/0027771 | A1 | * | 2/2006 | Baumann .................. F16K 1/14 |
| | | | | 251/119 |
| 2007/0069172 | A1 | * | 3/2007 | Brenner ............. F16K 31/0606 |
| | | | | 251/129.15 |
| 2008/0204176 | A1 | | 8/2008 | Siriraksat et al. |
| 2012/0292549 | A9 | * | 11/2012 | Doutt ..................... F16K 11/044 |
| | | | | 251/333 |
| 2015/0337981 | A1 | * | 11/2015 | Miller ................. F16K 31/0672 |
| | | | | 251/65 |

FOREIGN PATENT DOCUMENTS

| | | |
|---|---|---|
| DE | 103 34 684 A1 | 2/2004 |
| EP | 2 256 389 A1 | 12/2010 |
| EP | 3 086 334 A1 | 10/2016 |

OTHER PUBLICATIONS

Written Opinion issued in corresponding International (PCT) Patent Application No. PCT/US2019/041506 (dated Oct. 2, 2019).

* cited by examiner

MAGNETIC LATCHING SOLENOID VALVE

BACKGROUND OF THE INVENTION a. Field of the Invention

This disclosure relates to a latching valve. In particular, this disclosure relates to a latching valve having fewer parts to reduce cost and simplify assembly.

b. Background Art

Many conventional valves employ solenoids to move a valve member between a plurality of positions to control fluid flow. When electrical current is provided to the solenoid, the valve members is moved from a normal position to a working position. When the current is terminated, the valve member returns to the normal position—often under the influence of spring or gravitational forces or another external force. In order to maintain the valve member in the working position, it is necessary to continuously provide current to the solenoid. To reduce power demands, latching solenoid valves have been developed in which a momentary current causes movement of the valve member from the normal position to the working position and the valve member remains in the working position until another momentary current is applied. Commonly assigned U.S. Pat. No. 8,590,571 discloses one common latching solenoid valve in which a pair of solenoids act to move a valve member in the form of a shuttle between the positions. Although the valve works well for its intended purpose, the valve has a relatively large number of parts including multiple solenoids and the shuttle. The large part count results in a relatively high cost and increases assembly time for the valve.

The inventor herein has recognized a need for a latching valve that will minimize and/or eliminate one or more of the above-identified deficiencies.

BRIEF SUMMARY OF THE INVENTION

This disclosure relates to a latching valve. In particular, this disclosure relates to a latching valve having fewer parts to reduce cost and simplify assembly.

A latching valve in accordance with one embodiment includes a valve body defining a fluid chamber, a supply port in fluid communication with the fluid chamber and through which fluid is supplied to the fluid chamber, a delivery port in fluid communication with fluid chamber and through which fluid is delivered from the fluid chamber, and an exhaust port in fluid communication with the fluid chamber and an atmosphere and through which fluid is exhausted from the fluid chamber to the atmosphere. The valve further includes a solenoid disposed within the fluid chamber of the valve body. The solenoid includes an annular pole piece defining a fluid passage between the fluid chamber and the exhaust port. The pole piece has a first end facing the exhaust port and a second end defining a first valve seat. The solenoid further includes a coil disposed about the pole piece and a housing having a first portion disposed radially outwardly of the coil, and second and third portions extending radially inwardly from the first portion and disposed on opposite sides of the coil. The third portion is radially aligned with the pole piece. The solenoid further includes an armature having a first end configured for engagement with the first valve seat and a second end configured for engagement with a second valve seat formed in the valve body between the fluid chamber and the supply port. The armature is radially aligned with the second portion of the housing. The solenoid further includes a return spring biasing the armature towards the second valve seat. The valve further includes a magnet ring disposed about the armature and in contact with the second portion of the housing.

A latching valve in accordance with another embodiment includes a valve body defining a fluid chamber, a supply port in fluid communication with the fluid chamber and through which fluid is supplied to the fluid chamber, a delivery port in fluid communication with fluid chamber and through which fluid is delivered from the fluid chamber, and an exhaust port in fluid communication with the fluid chamber and an atmosphere and through which fluid is exhausted from the fluid chamber to the atmosphere. The valve further includes a solenoid disposed within the fluid chamber of the valve body. The solenoid includes an annular pole piece defining a fluid passage between the fluid chamber and the exhaust port. The pole piece has a first end facing the exhaust port and a second end defining a first valve seat. The solenoid further includes a coil disposed about the pole piece and a housing having a first portion disposed radially outwardly of the coil and second and third portions extending radially inwardly from the first portion and disposed on opposite sides of the coil. The third portion is radially aligned with the pole piece. The solenoid further includes an armature having a first end configured for engagement with the first valve seat and a second end configured for engagement with a second valve seat formed in the valve body between the fluid chamber and the supply port. The armature is radially aligned with the second portion of the housing. The solenoid further includes a return spring biasing the armature towards the second valve seat. The valve further includes a magnet ring disposed about the armature and in contact with the second portion of the housing. Current having a first polarity supplied to the coil creates a first electromagnetic force in the solenoid that combines with a magnetic force generated by the magnet ring and a fluid force from fluid at the supply port to overcome a spring force of the return spring and move the armature away from the second valve seat and towards the first valve seat to fluidly couple the supply and delivery ports. Current having a second polarity, opposite the first polarity, supplied to the coil creates a second electromagnetic force in the solenoid that cancels the magnetic force of the magnet ring such that the spring force of the return spring overcomes the fluid force of the fluid at the supply port and moves the armature away from the first valve seat and towards the second valve seat to fluidly couple the delivery and exhaust ports.

A method for controlling a latching valve comprising a valve body, a solenoid and magnet ring, the valve body defining a fluid chamber, a supply port in fluid communication with the fluid chamber and through which fluid is supplied to the fluid chamber, a delivery port in fluid communication with fluid chamber and through which fluid is delivered from the fluid chamber, and an exhaust port in fluid communication with the fluid chamber and an atmosphere and through which fluid is exhausted from the fluid chamber to the atmosphere, the solenoid disposed within the fluid chamber of the valve body and including an annular pole piece defining a fluid passage between the fluid chamber and the exhaust port, the pole piece having a first end facing the exhaust port and a second end defining a first valve seat, a coil disposed about the pole piece, a housing having a first portion disposed radially outwardly of the coil and second and third portions extending radially inwardly from the first portion and disposed on opposite sides of the coil, the third portion radially aligned with the pole piece, an armature having a first end configured for engagement with the first valve seat and a second end configured for engagement with a second valve seat formed in the valve body between the fluid chamber and the supply port, the armature radially aligned with the second portion of the housing, and a return spring biasing the armature towards the second valve seat, the magnet ring disposed about the armature and in contact with the second portion of the housing, include several steps. The method includes the step of supplying, when a supply pressure is desired at the delivery port, current having a first polarity to the coil to create a first electromagnetic force in the solenoid that combines with a magnetic force generated by the magnet ring and a fluid force from fluid at the supply port to overcome a spring force of the return spring and move the armature away from the second valve seat and towards the first valve seat to fluidly couple the supply and delivery ports. The method further includes the step of terminating the supply of current having the first polarity to the coil. The method further includes the step of supplying, when an exhaust pressure is desired at the delivery port, current having a second polarity, opposite the first polarity, to the coil to create a second electromagnetic force in the solenoid that cancels the magnetic force of the magnet ring such that the spring force of the return spring overcomes the fluid force of the fluid at the supply port and moves the armature away from the first valve seat and towards the second valve seat to fluidly couple the delivery and exhaust ports.

A latching valve in accordance the present teachings represent an improvement as compared to conventional latching valves. In particular, the latching valve provides a latching function while using a single solenoid. Further the latching valve employs the armature of the solenoid as the shuttle valve member. As a result, the latching valve eliminates the need for both a second solenoid and the shuttle relative to the valve illustrated in U.S. Pat. No. 8,590,571. The reduction in part count reduces the cost of the valve and simplifies assembly of the valve.

The foregoing and other aspects, features, details, utilities, and advantages of the present teachings will be apparent from reading the following description and claims, and from reviewing the accompanying drawings.

DETAILED DESCRIPTION OF THE INVENTION

Figure 1:
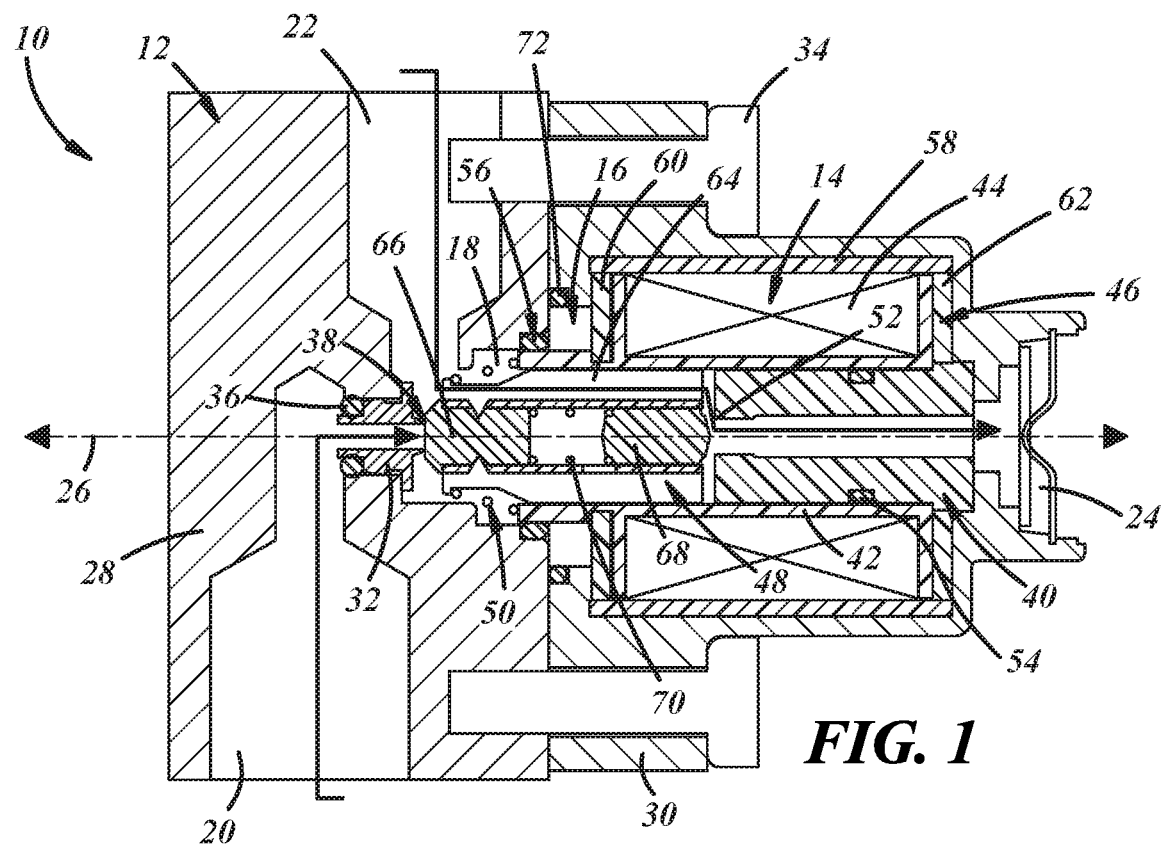
FIG. 1 is cross-sectional view of one embodiment of a latching valve showing the valve in a state where fluid is exhausted through the delivery and exhaust ports of the valve.

Referring now to the drawings wherein like reference numerals are used to identify identical components in the various views, FIG. 1 illustrates one embodiment of a latching valve 10 in accordance with the present teachings. Valve 10 is configured for use in commercial vehicles and, in particular, for use as a pilot valve to control the operation of larger fluid handling valves that are used in controlling a variety of systems on commercial vehicles including fifth wheel and differential locking systems, door control systems, transmission control systems and suspension dumping systems (i.e. exhausting air from pneumatic suspensions to increase stability during loading and unloading of the vehicle). Valve 10 may act as an interface between an electronic controller and larger fluid handling valves used on commercial vehicles. It should be understood, however, that valve 10 may be used in a wide variety of vehicles and in a wide variety of applications including vehicular and non-vehicular applications. Valve 10 may include a valve body 12, a solenoid 14, and a magnet ring 16.

Valve body 12 defines the fluid flow paths for valve 10. Valve body 12 is also configured to position and orient the other components of valve 10. Body 12 defines a fluid chamber 18 and a supply port 20, delivery port 22, and exhaust port 24 configured for fluid communication with chamber 18. Supply port 20 is configured to supply fluid to chamber 18 from an external fluid source. Delivery port 22 is configured to deliver fluid from chamber 18 to an external fluid destination. Exhaust port 24 is in fluid communication with the atmosphere and is configured to exhaust fluid from chamber 18 to the atmosphere. Chamber 18 is disposed about an axis 26 extending through a center of exhaust port 24. Fluid flow enters supply port 20 and exits delivery port 22 in a direction perpendicular to axis 26. It should be understood, however, that the orientation of the ports 20, 22, 24 may vary. Valve body 12 may include multiple members 28, 30, 32. Member 28 defines a portion of chamber 18, supply port 20 and delivery port 22. Member 30 defines another portion of chamber 18 and exhaust port 24. Member 30 houses solenoid 14 and magnet ring 16 and may be over molded onto solenoid 14. Member 30 may be coupled to member 28 using conventional fasteners 34 such as screws or bolts such that member 30, solenoid 14 and magnet ring 16 are simultaneously assembled as unit to member 28. Member 32 is disposed within member 28 and supported on member 28. Member 32 is annular in shape and defines a fluid passage extending between chamber 18 and supply port 20. The outer diameter of member 32 may vary along its length. In particular, the outer diameter may be narrowest proximate one end and configured to receive a fluid seal 36 disposed between members 28, 32 while the outer diameter may be greatest proximate an opposite end defining a radially outwardly extending flange configured to engage a wall of member 28. Member 32 defines a normally closed valve seat 38 between fluid chamber 18 and supply port 20 for a member of solenoid 14 as described in greater detail below. Members 28, 30, 32 may be made from different materials. In accordance with one embodiment, members 28, 30 may be made from plastic while member 32 is made from a metal alloy to allow improved formation of the valve seat 38 and to better withstand deformation from impact with members of solenoid 14. Member 32 may be made from brass or another non-ferromagnetic material to reduce or prevent magnetic flux from straying from the intended electromagnetic circuit in solenoid 14. In other embodiments, member 28 may itself be formed from a metal alloy and members 28, 32 may be integrated into a unitary (one-piece) body.

Solenoid 14, together with magnet ring 16, is provided to control the fluid flow path through valve body 12. Solenoid 14 is disposed within fluid chamber 18 within valve body 12. Solenoid 14 includes a pole piece 40, a bobbin 42, a coil 44, a housing 46, an armature 48 and a return spring 50.

Pole piece 40 forms a part of an electromagnet circuit intended to create movement of armature 48 along axis 26. Pole piece 40 also forms a normally open valve seat 52 for armature 48. Pole piece 40 is made from materials having a relatively low magnetic reluctance including ferromagnetic materials such as steel. Pole piece 40 is annular in construction and may be disposed about, and centered about, axis 26. Pole piece 40 defines a fluid passage extending along axis 26 between fluid chamber 18 and exhaust port 24. One longitudinal end of pole piece 40 faces exhaust port 24 while the opposite longitudinal end defines valve seat 52 for armature 48. An outer diameter of pole piece 40 may vary along the length of pole piece 40. In particular, the outer diameter of pole piece 40 may define shoulders proximate the end facing exhaust port 24 which are configured to receive portions of bobbin 42 and housing 46. Pole piece 40 may also define a groove configured to receive a fluid seal 54 disposed between pole piece 40 and bobbin 42.

Bobbin 42 is provided to position and orient coil 44. Bobbin 42 may be made from materials having a relatively high magnetic reluctance such as plastics. Bobbin 42 is annular in shape and may disposed about, and centered about, axis 26. An inner diameter of bobbin 42 is sized to receive pole piece 40 and armature 48 therein. An outer diameter supports coil 44, housing 46, magnet ring 16 and a fluid seal 56 disposed between bobbin 42 and member 28 of valve body 12. In particular, bobbin 42 defines two radially extending flanges between which coil 44 is disposed. Bobbin 42 further defines a groove configured to receive a portion of housing 46 and reduce a flux gap between housing 46 and armature 48, and a ledge for magnet ring 16. One longitudinal end of bobbin 42 may further define a spring seat for return spring 50.

Coil 44 is provided to conduct current used to form an electromagnetic circuit among pole piece 40, coil 44, housing 46 and armature 48. Coil 44 may be selectively coupled to a power source (not shown) such as a battery by a controller (not shown) such as a microprocessor or application specific integrated circuit (ASIC). Coil 44 is supported on bobbin 42 and is disposed about pole piece 40.

Housing 46 encloses coil 44 and forms part of the electromagnetic circuit within solenoid 14. Housing 46 may be made from materials having a relatively low magnetic reluctance such as steel. Housing 46 includes a tubular portion 58 disposed radially outwardly of coil 44 and portions 60, 62 that contact tubular portion 58 and extend radially inwardly from the longitudinal ends of tubular portion 58. Portions 60, 62 are disposed on opposite sides of coil 44. In the illustrated embodiment, the portions 60, 62 of housing 46 comprise washers and are separate members of housing 46 relative to tubular portion 58. It should be understood, however, that housing 46 could be a unitary (one-piece) body. Portions 60, 62 are radially aligned with armature 48 and pole piece 40, respectively. Portion 60 is configured to be received within a groove formed in bobbin 42 between magnet ring 16 and a radially outwardly extending flange of bobbin 42. Portion 62 is configured to be received between a shoulder formed in pole piece 40 and the other radially outwardly ending flange of bobbin 42.

Armature 48 determines the direction of fluid flow based on the position of armature 48 within fluid chamber 18. Armature 48 includes a cylindrical body 64 made from ferromagnetic materials or similar materials having a relatively low magnetic reluctance. Body 64 forms a part of the electromagnetic circuit in solenoid 14. Body 64 is sized to be received within bobbin 42. The outer diameter of body 64 tapers towards a reduced diameter portion proximate one longitudinal end in order to accommodate return spring 50 and defines a radially outwardly extending lip at the end acting as a spring seat for spring 50 opposing the spring seat formed at the end of bobbin 42. Armature 48 further includes inserts 66, 68 that are disposed within body 64 at opposite ends of body 64. Inserts 66, 68 may be made from a polymeric material and, in particular, an elastomeric material such as rubber. Inserts 66, 68 are configured to engage valve seats 38, 52, respectively, and form fluid seals at valve seats 38, 52. Inserts 66, 68 may be configured to optimize sealing at the valve seats 38, 52. Inserts 66, 68 may be retained within body 64 through crimping of body 64, adhesives or other means. Armature 48 further includes a compression spring 70 that is disposed within body 64 between inserts 66, 68. Spring 70 biases inserts 66, 68 apart and prevents inserts 66, 68 from being forced further into body 64 during engagement with valve seats 38, 52.

Return spring 50 biases armature in one direction along axis 26. In particular, spring 50 comprises a compression spring that biases armature 48 towards valve seat 38 in member 32 of valve body 12. Spring 50 has a conical shape and surrounds a portion of body 64 of armature 48. Spring 50 is seated between a longitudinal end of bobbin 42 and a radially outwardly extending lip at one longitudinal end of body 64 of armature 48.

Magnet ring 16 is provided to generate a magnetic force used to maintain the position of armature 48 against pole piece 40 after armature 48 contacts valve seat 52 and the supply of current to coil 44 is terminated. Magnet ring 16 may comprise a permanent magnet made from rare earth materials such as neodymium. Magnet ring 16 is annular in shape and is disposed about armature 48 and may be disposed about, and centered about, axis 26. Magnet ring 16 is supported on bobbin 42 and disposed radially between a radially outer surface of bobbin 42 and a radially inner surface in member 30 of valve body 12. Magnet ring 16 is further disposed axially between portion 60 of housing 46 and a radially extending surface in member 28 of valve body 12. Fluid seals 56, 72 may be disposed between magnet ring 16 and members 28, 30 in valve body 12.

Figure 2:
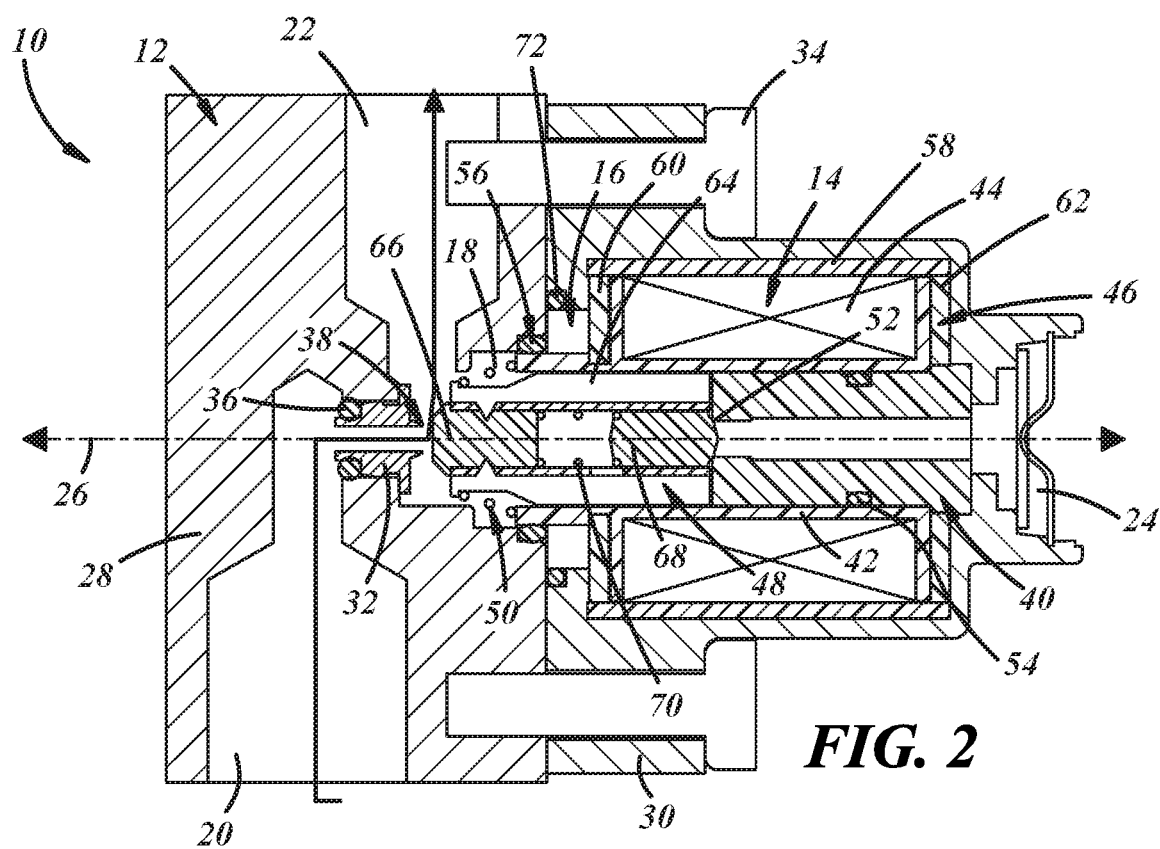
FIG. 2 is a cross-sectional view of the latching valve of FIG. 1 showing the valve in a state where fluid is being delivered through the supply and delivery ports of the valve.

Referring to FIG. 1-2, valve 10 operates in the following manner. FIG. 1 shows valve 10 latched in a state in which fluid flow from supply port 20 to delivery port 22 is prevented while fluid flow from delivery port 22 to exhaust port 24 is allowed. During this state, no current is delivered to coil 44 and, therefore, no electromagnetic circuit is formed and no electromagnetic force is present. The magnet ring 16 generates a magnetic force that creates a magnetic circuit within magnet ring 16, armature 48, pole piece 40 and housing 46 that urges armature 48 away from valve seat 38 and towards valve seat 52. However, a spring force exerted by return spring 50 exceeds the combination of this magnetic force and a fluid force from the fluid at supply port 20 to maintain the position of armature 48 against valve seat 38. When a supply pressure is desired at the delivery port and it is desired to change the state of valve 10, a momentary current is provided to coil 44 creating an electromagnetic circuit in solenoid 14 among pole piece 40, coil 44, housing 46 and armature 48. The current has a polarity such that the magnetic flux flowing through the electromagnetic circuit is aligned with the flow of magnetic flux in the magnetic circuit among magnet ring 16, armature 48, pole piece 40 and housing 46 and generates an electromagnetic force urging armature 48 away from valve seat 38 and towards valve seat 52. The electromagnetic force combines with the magnetic force generated by magnet ring 16 and the fluid force from fluid at supply port 20 to overcome a spring force from return spring 50 and move armature 48 away from valve seat 38 and towards valve seat 52. As a result, valve 10 assumes a second state illustrated in FIG. 2 in which fluid flow from supply port 20 to delivery port 22 is allowed while fluid flow from delivery port 22 to exhaust port 24 is prevented.

Movement of the armature 48 from valve seat 38 to valve seat 52 reduces the magnetic reluctance within the magnetic circuit among magnet ring 16, armature 48, pole piece 40 and housing 46 by eliminating an air gap between armature 48 and pole piece 40, thereby strengthening the magnetic circuit. As a result, current delivery to coil 44 may be terminated and valve 10 will remain latched in the state shown in FIG. 2 because the magnetic force generated by magnet ring 16 and the fluid force at supply port 20 are now sufficient to overcome, without additional electromagnetic forces, the spring force from spring 50. When an exhaust pressure is desired at the delivery port and it is desired to return valve 10 from the state shown in FIG. 2 to its original state shown in FIG. 1, a momentary current is again provided to coil 44 to create an electromagnetic circuit in solenoid 14 among pole piece 40, coil 44, housing 46 and armature 48. This current has the opposite polarity relative to the current used to move valve 10 from the state shown in FIG. 1 to the state shown in FIG. 2 (the polarity of the current may be controlled by the controller reference above). As a result, the magnetic flux flowing through the electromagnetic circuit is opposite to the flow of magnetic flux in the magnetic circuit among magnet ring 16, armature 48, pole piece 40 and housing 46 and generates an electromagnetic force from the electromagnetic circuit that cancels the magnetic force of magnet ring 16. Because the spring force of spring 50 is greater than any fluid force in supply port 20, armature 48 moves away from valve seat 52 and towards valve seat 38, returning to the state illustrated in FIG. 1. Movement of armature 48 from valve seat 52 to valve seat 38 also increases the magnetic reluctance within the magnetic circuit including magnet ring 16, armature 48, pole piece 40 and housing 46 by re-establishing the air gap between armature 48 and pole piece 40. As a result, current delivery to coil 44 may again be terminated and valve 10 will remain latched in the state shown in FIG. 1 because the magnetic force generated by magnet ring 16 and the fluid force at supply port 20 are insufficient to overcome the spring force from spring 50.

A latching valve 10 in accordance the present teachings represent an improvement as compared to conventional latching valves. In particular, the latching valve 10 provides a latching function while using a single solenoid 14. Further the latching valve 10 employs the armature 48 of the solenoid 14 as the shuttle valve member. As a result, the latching valve 10 eliminates the need for both a second solenoid and the shuttle relative to the valve illustrated in U.S. Pat. No. 8,590,571. The reduction in part count reduces the cost of the valve and simplifies assembly of the valve.

While the invention has been shown and described with reference to one or more particular embodiments thereof, it will be understood by those of skill in the art that various changes and modifications can be made without departing from the spirit and scope of the invention.

What is claimed is:

1. A latching valve, comprising:
    a valve body defining a fluid chamber, a supply port in fluid communication with the fluid chamber and through which fluid is supplied to the fluid chamber, a delivery port in fluid communication with fluid chamber and through which fluid is delivered from the fluid chamber, and an exhaust port in fluid communication with the fluid chamber and an atmosphere and through which fluid is exhausted from the fluid chamber to the atmosphere;
    a solenoid disposed within the fluid chamber of the valve body, the solenoid including
        an annular pole piece defining a fluid passage extending along an axis between the fluid chamber and the exhaust port, the pole piece having a first end facing the exhaust port and a second end defining a first valve seat;
        a coil disposed about the pole piece;
        a housing having a first portion disposed radially outwardly of the coil, and second and third portions extending radially inwardly from the first portion and disposed on opposite sides of the coil, the third portion radially aligned with the pole piece;
        an armature having a first end configured for engagement with the first valve seat and a second end configured for engagement with a second valve seat formed in the valve body between the fluid chamber and the supply port, the armature radially aligned with the second portion of the housing; and,
        a return spring biasing the armature towards the second valve seat; and,
    a magnet ring disposed about the armature and in contact with the second portion of the housing
    wherein the solenoid further includes a bobbin configured to receive the pole piece and armature and supporting the coil and the magnet ring, the bobbin extending through, and disposed radially inward, of the magnet ring.

2. The latching valve of claim 1 wherein the valve body includes a first member defining the supply port and the delivery port and a second member defining the exhaust port, the second member housing the solenoid and magnet ring and configured for coupling to the first member.

3. The latching valve of claim 1 wherein the valve body includes a first member defining the supply port and the delivery port and a second annular member supported by the first member and defining the second valve seat, the first and second members made from different materials and the second member having an inner diameter defining a fluid passage between the fluid chamber and the supply port.

4. The latching valve of claim 3 wherein the first member is made from a plastic and the second member is made from a metal alloy.

5. The latching valve of claim 3 wherein the second member is made from a non-ferromagnetic material.

6. The latching valve of claim 1 wherein the return spring is seated between the bobbin and the armature.

7. The latching valve of claim 1 wherein the armature includes:
    a cylindrical body made from a ferromagnetic material;
    first and second inserts disposed within the cylindrical body at opposite ends of the cylindrical body; and,
    a spring disposed between the first and second inserts and urging the first and second inserts apart.

8. The latching valve of claim 7 wherein the first and second inserts are made from a polymeric material.

9. The latching valve of claim 8 wherein the first and second inserts are made from an elastomeric material.

10. The latching valve of claim 1 wherein the magnet ring always biases the armature towards the first valve seat.

11. The latching valve of claim 1 wherein the magnet ring is disposed outside of the housing.

12. The latching valve of claim 11 wherein the magnet ring is disposed on an opposite side of the second portion of the housing relative to the coil.

13. The latching valve of claim 1 wherein an outer diameter of the pole piece varies to define a first shoulder configured to engage a first end of the bobbin and a second shoulder configured to engage a first end of the housing of the solenoid.

14. A latching valve, comprising:
a valve body defining a fluid chamber, a supply port in fluid communication with the fluid chamber and through which fluid is supplied to the fluid chamber, a delivery port in fluid communication with fluid chamber and through which fluid is delivered from the fluid chamber, and an exhaust port in fluid communication with the fluid chamber and an atmosphere and through which fluid is exhausted from the fluid chamber to the atmosphere;
a solenoid disposed within the fluid chamber of the valve body, the solenoid including
an annular pole piece defining a fluid passage extending along an axis between the fluid chamber and the exhaust port, the pole piece having a first end facing the exhaust port and a second end defining a first valve seat;
a coil disposed about the pole piece;
a housing having a first portion disposed radially outwardly of the coil, and second and third portions extending radially inwardly from the first portion and disposed on opposite sides of the coil, the third portion radially aligned with the pole piece;
an armature having a first end configured for engagement with the first valve seat and a second end configured for engagement with a second valve seat formed in the valve body between the fluid chamber and the supply port, the armature radially aligned with the second portion of the housing; and,
a return spring biasing the armature towards the second valve seat; and,
a magnet ring disposed about the armature and in contact with the second portion of the housing
wherein current having a first polarity supplied to the coil creates a first electromagnetic force in the solenoid that combines with a magnetic force generated by the magnet ring and a fluid force from fluid at the supply port to overcome a spring force of the return spring and move the armature away from the second valve seat and towards the first valve seat to fluidly couple the supply and delivery ports and current having a second polarity, opposite the first polarity, supplied to the coil creates a second electromagnetic force in the solenoid that cancels the magnetic force of the magnet ring such that the spring force of the return spring overcomes the fluid force of the fluid at the supply port and moves the armature away from the first valve seat and towards the second valve seat to fluidly couple the delivery and exhaust ports
wherein the solenoid further includes a bobbin configured to receive the pole piece and armature and supporting the coil and the magnet ring, the bobbin extending through, and disposed radially inward, of the magnet ring.

15. The latching valve of claim 14 wherein, after supply of the current having the first polarity and prior to supply of the current having the second polarity, the magnetic force of the magnet ring and the fluid force of the fluid at the supply port exceed the spring force of the return spring and maintain the armature against the first valve seat.

16. The latching valve of claim 14 wherein movement of the armature away from the second valve seat and towards the first valve seat reduces a magnetic reluctance in a magnetic circuit formed by the pole piece, the housing, the armature and the magnet ring.

17. The latching valve of claim 14 wherein the valve body includes a first member defining the supply port and the delivery port and a second member defining the exhaust port, the second member housing the solenoid and magnet ring and configured for coupling to the first member.

18. The latching valve of claim 14 wherein the valve body includes a first member defining the supply port and the delivery port and a second annular member supported by the first member and defining the second valve seat, the first and second members made from different materials and the second member having an inner diameter defining a fluid passage between the fluid chamber and the supply port.

19. The latching valve of claim 18 wherein the first member is made from a plastic and the second member is made from a metal alloy.

20. The latching valve of claim 18 wherein the second member is made from a non-ferromagnetic material.

21. The latching valve of claim 14 wherein the return spring is seated between the bobbin and armature.

22. The latching valve of claim 14 wherein the armature includes:
a cylindrical body made from a ferromagnetic material;
first and second inserts disposed within the cylindrical body at opposite ends of the cylindrical body; and,
a spring disposed between the first and second inserts and urging the first and second inserts apart.

23. The latching valve of claim 22 wherein the first and second inserts are made from a polymeric material.

24. The latching valve of claim 22 wherein the first and second inserts are made from an elastomeric material.

25. The latching valve of claim 14 wherein an outer diameter of the pole piece varies to define a first shoulder configured to engage a first end of the bobbin and a second shoulder configured to engage a first end of the housing of the solenoid.

26. A method for controlling a latching valve comprising a valve body, a solenoid and magnet ring, the valve body defining a fluid chamber, a supply port in fluid communication with the fluid chamber and through which fluid is supplied to the fluid chamber, a delivery port in fluid communication with fluid chamber and through which fluid is delivered from the fluid chamber, and an exhaust port in fluid communication with the fluid chamber and an atmosphere and through which fluid is exhausted from the fluid chamber to the atmosphere, the solenoid disposed within the fluid chamber of the valve body and including an annular pole piece defining a fluid passage between the fluid chamber and the exhaust port, the pole piece having a first end facing the exhaust port and a second end defining a first valve seat, a coil disposed about the pole piece, a housing having a first portion disposed radially outwardly of the coil and second and third portions extending radially inwardly from the first portion and disposed on opposite sides of the coil, the third portion radially aligned with the pole piece, an armature having a first end configured for engagement with the first valve seat and a second end configured for engagement with a second valve seat formed in the valve body between the fluid chamber and the supply port, the armature radially aligned with the second portion of the housing, and a return spring biasing the armature towards the second valve seat, the magnet ring disposed about the armature and in contact with the second portion of the housing, the solenoid further including a bobbin configured to receive the pole piece and armature and supporting the coil and the magnet ring, the bobbin extending through, and disposed radially inward, of the magnet ring, the method comprising the steps of:

supplying, when a supply pressure is desired at the delivery port, current having a first polarity to the coil to create a first electromagnetic force in the solenoid that combines with a magnetic force generated by the magnet ring and a fluid force from fluid at the supply port to overcome a spring force of the return spring and move the armature away from the second valve seat and towards the first valve seat to fluidly couple the supply and delivery ports;

terminating the supply of current having the first polarity to the coil;

supplying, when an exhaust pressure is desired at the delivery port, current having a second polarity, opposite the first polarity, to the coil to create a second electromagnetic force in the solenoid that cancels the magnetic force of the magnet ring such that the spring force of the return spring overcomes the fluid force of the fluid at the supply port and moves the armature away from the first valve seat and towards the second valve seat to fluidly couple the delivery and exhaust ports.

\* \* \* \* \*